United States Patent [19]
Brownscombe

[11] Patent Number: 4,480,005
[45] Date of Patent: Oct. 30, 1984

[54] THIN LAYER THERMOPLASTIC POLYMER BONDED COVALENTLY AT ITS SURFACE TO A MINERAL COMPONENT

[75] Inventor: Thomas F. Brownscombe, Houston, Tex.

[73] Assignee: Shell Oil Company, Houston, Tex.

[21] Appl. No.: 529,251

[22] Filed: Sep. 6, 1983

Related U.S. Application Data

[62] Division of Ser. No. 257,834, Apr. 27, 1981, Pat. No. 4,425,384.

[51] Int. Cl.$^3$ .................... B05D 7/00; C08K 3/34; C08K 3/00; B32B 27/08
[52] U.S. Cl. .................... 428/336; 427/221; 427/299; 428/333; 428/407; 428/516; 428/517; 428/521; 428/523; 523/205; 523/209; 524/444; 524/445; 524/449; 524/450; 524/451; 524/452; 524/505; 524/554
[58] Field of Search ............ 428/333, 336, 516, 517, 428/407, 521, 523; 524/444, 445, 449, 450, 451, 452, 505, 554; 523/205, 209; 427/221, 299

[56] References Cited

U.S. PATENT DOCUMENTS

| | | | |
|---|---|---|---|
| 3,839,062 | 10/1974 | Mercier et al. | 528/10 |
| 3,893,969 | 7/1975 | Newbould et al. | 523/209 |
| 3,897,586 | 7/1975 | Coker | 427/221 |
| 3,935,339 | 1/1976 | Cooke | 427/221 |
| 3,992,558 | 11/1976 | Smith-Johannsen et al. | 427/221 |
| 4,017,452 | 4/1977 | Swartz | 427/221 |
| 4,091,164 | 5/1978 | Schwartz | 427/221 |
| 4,251,432 | 2/1981 | Martin | 523/205 |

OTHER PUBLICATIONS

Derwent Abstract 36653 B/19 (Su-612937) Jun. 1978.

*Primary Examiner*—Herbert J. Lilling

[57] ABSTRACT

A polymer reinforcing material, consisting of a particulate or filamentary mineral component having a thin polymer-interactive layer, averaging about 5–500 Angstrom in thickness, of silicon-free and heavy metal-free organic molecules chemically bonded to its surface by covalent bonding, when used in relatively small amounts in the range from 1 to 20 phr is capable of providing superior retention or increase of desirable polymer properties especially impact resistance, compared to the use of conventional reinforcement in the same polymer, while providing increased stiffness and retention of strength at elevated temperatures. The reinforcing material is prepared by contacting a particulate or filamentary mineral component which has reactive sites at its surface with certain organic compounds at reaction conditions at which a covalent chemical bond is established between the mineral surface and the organic compound by reaction of a reactive surface site of the mineral with a site-reactive atom or group of the organic compound.

6 Claims, 1 Drawing Figure

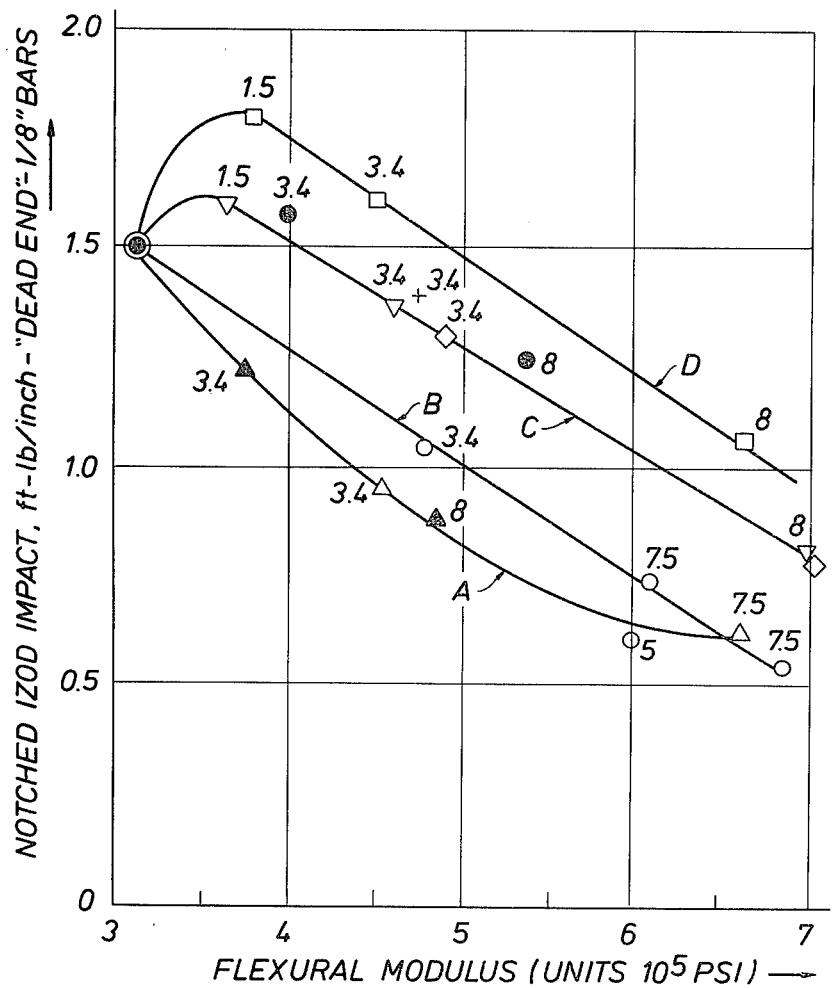
FIG.1 IMPACT-STIFFNESS BALANCE IN HIGH IMPACT POLYSTYRENE MATRIX
NUMERALS NEXT TO DATA POINTS INDICATE VOLUME PERCENT OF REINFORCING COMPOSITION.

THIN LAYER THERMOPLASTIC POLYMER BONDED COVALENTLY AT ITS SURFACE TO A MINERAL COMPONENT

CROSS REFERENCE TO RELATED APPLICATIONS

This is a division of application Ser. No. 257,834, filed Apr. 27, 1981, now U.S. Pat. No. 4,425,384.

Reinforced plastic compositions utilizing the reinforcing compositions of this invention are described and claimed in my copending application Ser. No. 296,032, filed Aug. 25, 1981, now U.S. Pat. No. 4,405,727.

BACKGROUND OF THE INVENTION

This invention is directed to improvements in particulate and filamentary mineral polymer-reinforcing compositions and to their preparation. More particularly, this invention relates to chemically modified mineral reinforcing agents for thermoplastic polymers.

The Prior Art: Thermoplastic polymers are finding an increasing number of uses as structural materials. They are especially attractive as replacements for metals because of the reduction in weight that can often be achieved, as for example, in automotive applications. However, for any particular application, a thermoplastic polymer by itself may not offer the combination of properties desired and means to correct this deficiency are therefore of interest. In order to increase the rigidity and strength of thermoplastic polymers, it is a common practice to incorporate a quantity of filler, e.g., a natural or synthetic mineral material, in the particulate or filamentary form, e.g., as fibers or flakes. When the mixture of polymer and fibers or flakes is injection molded into a sheet form, the flow tends to cause the particles of filler to line up parallel to the sheet. If the particles have a high aspect ratio and have a high rigidity and strength, they will then constitute an effective reinforcement in the direction of alignment.

Several types of mineral fillers are in commercial use. The most frequently employed are glass fibers, asbestos fibers, clay-type minerals such as kaolin, calcium salts such as wollastonite and calcium carbonate and platy clay minerals such as talc and mica.

It is known that glass filaments must receive a chemical surface treatment or "sizing" in order to be effective as polymer reinforcement. Silicon compounds, such as polysiloxanes, are typically employed for this purpose to provide adhesion between the glass and the thermoplastic polymer. Other agents, such as "starch oil", provide lubrication; polymeric materials have been used to bind the fibers into a bundle.

In the case of normal sizing of glass fibers, the sizing compounds are not covalently bonded to the matrix. In such systems the glass fiber has a corrosion layer on the surface. This is a layer of etched glass which has had the alkali earth oxides leached out of it by water. On the surface of this corrosion layer there are islands of polysiloxanes deposited by the silane coupling agent. These islands of polysiloxanes are hydrogen bonded to the corrosion layer and not directly covalently bound to the matrix. It is well known that glass laminates treated with silane sizing agents lose strength on immersion in water. This is because the water diffuses along the surface of the glass fiber through this corrosion layer, wets the corrosion layer and lubricates the interface between the polysiloxane surface coat and the glass. This again demonstrates that the siloxanes are not directly bonded to the glass.

Another common surface finish for glass fibers is a family of chromium complexes, known as volanes. These have an ionic interaction with the surface of the mineral. It is not clear whether they are in fact ionically bonded, as is claimed for them, or whether they are hydrogen bonded like the silane compounds. In any event, they are not covalently bonded.

A variety of similar treatments have also been disclosed for mineral fillers other than glass fibers, especially mica and wollastonite. For example, it has been suggested to polymerize monomers such as methyl methacrylate, acrylonitrile or the like by a free radical mechanism to deposit a polymer on the mineral surface. On the basis of known reactivity of the different sorts of radicals it is expected that these polymers are not covalently bonded to the mineral surface.

Mineral fillers of the prior art, especially those other than glass fibers, must be added in large concentrations, typically from 20 to 40 parts by weight per hundred parts of resin (phr) or more, in order to achieve the desired increase in stiffness. Addition of such large amounts of mineral fillers causes losses in other properties of the polymers, primarily impact resistance and tensile properties, rendering such polymers unsuitable for many premium uses.

Appropriately selected reinforcing materials of the present invention have the advantage, when used in lower concentrations from 1 to 20 phr, of producing a desired increase in stiffness of polymers without significant loss in other desired properties, and even a gain in impact strength in some cases.

SUMMARY OF THE INVENTION

This invention provides novel particulate or filamentary mineral polymer-reinforcing compositions and methods for preparing them. The novel aspect of the compositions is the presence of a very thin layer of certain organic compounds bonded by covalent chemical bonding to the surface of the mineral material. The compositions will be referred to as "polymer-bonded" reinforcements; they are distinctly superior to polymer-coated mineral fillers or reinforcements prepared by precipitating a polymer onto a mineral surface without chemical bonding of the polymer to the surface. They are also superior to compositions prepared by suspending the filler or reinforcement in a liquid in which a monomer is undergoing polymerization.

Use of relatively small amounts in the range from 1 to 20 phr of appropriate compositions of this invention in thermoplastic polymers results in superior retention or increase of desirable polymer properties, especially impact resistance, compared to the use of conventional reinforcement in the same polymer, while providing increased stiffness and retention of strength at elevated temperatures.

The molecules of the organic compounds employed in producing the bonded surface layer are characterized by two essential component parts. One of said component parts is a segment of substantial length, referred to herein as the "polymer-interacting" segment, which, when the polymer-bonded mineral particle or filament is present in a polymer melt, is capable of interacting with the polymer, due to the segment's length and similarity of structure to the polymer, as if the segment were part of the polymer. The second characterizing component is an atom or group, referred to herein as the "site-reactive" segment, which is capable of reacting with a reactive site on the surface of the mineral material to result in a covalent chemical bond between the mineral surface and the organic compound. The reactive site on the mineral surface is typically an oxygen atom or oxygen-containing group, such as a hydroxyl group. The site-reactive component capable of reacting therewith may be referred to as "oxygen-reactive". For use in this invention, organic compounds must contain at least one polymer-interacting segment and at least one site-reactive group, but may contain more than one of each. The organic compounds themselves may also be referred to as polymer-interacting and site-reactive, and the mineral compositions which result from covalent bonding of such compounds to the mineral surface may be referred to as polymer-interacting reinforcements. The organic compounds employed in this invention do not contain silicon or chromium—or other metals of Groups II-VIII of the Periodic Table—as a substituent, and are therefore referred to as "silicon-free" and "heavy metal-free".

This invention comprises both the mineral compositions having a thin polymer-interacting layer bonded to the surface by covalent bonds and methods for preparing these compositions. The methods of preparation comprise contacting a particulate or filamentary mineral component which has reactive sites at its surface with a polymer-interactive, site-reactive organic compound at reaction conditions at which a covalent chemical bond is established between the mineral surface and the organic compound by reaction of a reactive surface site of the mineral with a site-reactive atom or group of the organic compound.

The invention comprises three preferred modes of preparation.

In the first mode, mineral material which has reactive oxygen at its surface is brought into contact with an organic compound which has as the site-reactive group at least one olefinic double bond per molecule under reaction conditions at which the double bonds of the organic molecule or active oxygen on the mineral surface or both are protonated, whereby a covalent chemical bond is established between the mineral surface and the organic molecule.

In the second mode, mineral material which has reactive oxygen at its surface is brought into contact with an organic compound which has, as the site-reactive group, a substituent atom or group which is capable of nucleophilic displacement by reactive oxygen under reaction conditions at which at least one such substituent group or atom is displaced by an oxygen atom from the mineral surface, thus creating a covalent chemical bond between the surface and the organic molecule.

In the third mode, reactive sites consisting of groups capable of nucleophilic displacement are created on the surface of mineral material by reacting the mineral with a reagent which creates a "leaving group" or by drying at an elevated temperature, and the modified mineral material is contacted with an organic compound which has a nucleophilic group on the site-reactive group at reaction conditions at which a covalent bond is established between the mineral surface and the organic compound.

BRIEF DESCRIPTION OF THE DRAWING

The single FIGURE of the drawing is a graph illustrating the relation of impact and stiffness properties of polymers reinforced with some of the polymer reinforcing materials of this invention.

DESCRIPTION OF THE PREFERRED EMBODIMENTS

The polymer reinforcing materials of this invention consist of a mineral substrate and a polymer-interactive layer which is bound to the substrate by covalent chemical bonding and is produced by chemical reaction of the substrate with a site-reactive organic compound which has a polymer-interactive group.

The Mineral Substrates

Minerals are commonly defined as solid elements or compounds occurring naturally in the earth's surface. For purposes of this invention, the term "mineral materials" also includes synthetic materials such as silicas, silica-aluminas, and the like, i.e., synthetic minerals, but does not include metals as such.

The substrates suitable for use in the invention include the particulate or filamentary mineral materials which are known in the prior art as suitable for reinforcing organic polymer compositions, provided they have surface sites which are capable of covalent chemical bonding to a constituent of an organic molecule.

In one mode of practicing the invention, a mineral material is treated with a reagent which introduces reactive surface sites into the mineral surface.

The most common and generally preferred mineral reinforcing materials contain or consist of silicates or aluminosilicates and have as reactive sites on the surface oxygen atoms or hydroxyl groups.

The group of suitable reinforcing materials includes: glasses; silicates; aluminosilicates, including mica, talc, clays (preferably bentonite or kaolin), vermiculite and asbestos; calcium silicates, suitably wollastonite; silica and alumina.

The mica contemplated herein includes both natural and synthetic mica. Examples of natural mica include phlogopite, muscovite and biotite. Examples of synthetic mica include fluorophlogopite and barium disilicic. The chemical structure and description of mica is further described in Kirk-Othmer, "Encyclopedia of Chemical Technology", Second Edition, Volume 12, pages 398 et seq, and in Theng, "The Chemistry of Clay-Organic Reactions", John Wiley & Sons Publishers, pages 1–16 (1974). Vermiculite and montmorillonite are somewhat similar in structure and are also described in the above book passage by Theng. Talc, which is a high magnesium silicate, is described in Kirk-Othmer, "Encyclopedia of Chemical Technology", Second Edition, Volume 19, pages 608 et seq.

For use in the present invention, the mineral substrates are in particulate or filamentary forms, such as used for polymer reinforcement in the prior art.

Particulate substrates may be naturally occuring or manufactured particles of various shapes. Especially suitable and preferred for polymer reinforcement to improve strength and stiffness or hardness are platy particles such as mica and vermiculite. Preferred dimensions for such platy reinforcements are 100 to 1000 microns in length and width and 1 to 6 microns in thickness. Especially preferred for improvement of strength and stiffness of the reinforced polymers are platy reinforcements of high aspect ratio, in the range from 20 to 200.

Filamentary substrates may be standard glass fibers, chopped or continuous or milled; or naturally fibrous minerals, such as asbestos.

When applied to filamentary materials, the invention is useful when applied to conventional chopped glass fiber which typically are 2 to 15 millimeters in length before use and 0.3 to 4 millimeters after they are compounded into a polymer matrix. Aspect ratios may be as low as 10.

The substrates of the invention must have reactive sites on the surface, capable of forming covalent bonds with suitable organic molecules.

The substrates of the invention should be relatively dry. Although 1 to 3% by weight of water is generally acceptable, it is preferred to employ substrates containing no more than about 0.2% wt. of absorbed or adsorbed water. Substrates may therefore be suitably dried prior to use. Conventional drying methods, such as drying in moving air or inert gas at 100°–400° C., may suitably be used.

Glass fibers for polymer reinforcement in their commercial form have an organic coating or surface layer. This may interfere with preparation of the composition of this invention. Such glass fiber may therefore be treated for removal of adhering organic material under known conditions, as by heating under air flow at a temperature of 450°–490° C.

The following are characteristic reactive sites of glass and natural minerals:

$(-)_n M-OH$ $(-)_n M-O^{(-)}A^{(+)}$ $(-)_n M=O$

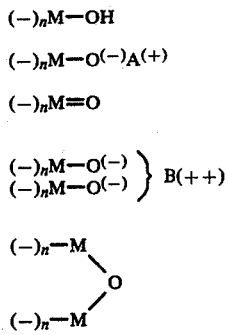

In the above formulas

M = a metal atom on the mineral surface, preferably Si or Al, but it may also be another metal of Groups II-VIII of the Periodic Table, e.g., Mg, Ca, Ti, V, Cr, Mn, Fe, Co, Ni, etc.

A = an alkali metal, e.g., K or Na

B = an alkaline earth metal, e.g., Ca or Ba $(—)_n$ represents the bonds between the metal atom M and other atoms of the mineral.

The surface of a mineral may also be chemically modified in order to enhance site reactivity, as, for example, by treatment of a mineral with thionyl chloride to incorporate $SO_2Cl$ groups on the surface. This treatment may be performed on glass or aluminosilicates such as mica or talc or the other materials mentioned above. Either the $SO_2Cl$ group bonded to the surface or its pyrolysis product which, after elimination of $SO_2$, will be SiCl or AlCl or, in general, MCl or combinations of MCl and MOH give a surface which can react with site reactive groups. These may, for example, be living polymeric materials, that is, the living organolithium compounds of polybutadiene or polystyrene/polybutadiene or polystyrene, or other nucleophilic site-reactive materials, such as polymeric amines, alcohols, esters, etc.

Another possible chemical modification is reaction of surface hydroxyl groups of minerals or glasses with bromine or chlorine to form hypobromites or hypochlorites on the surface. These surfaces are then activated for attack by organic materials.

Site-reactive Organic Compounds

The polymer interactive layer of the reinforcements of this invention is created by chemical reaction between the mineral substrate and an organic compound wich has a polymer-interacting component and a site-reactive component and does not contain silicon or heavy metal atoms.

The site-reactive component of the organic compounds is selected to be appropriate to the reactive sites on the mineral material. The following represents appropriate site-reactive groups:

Site-reactive group

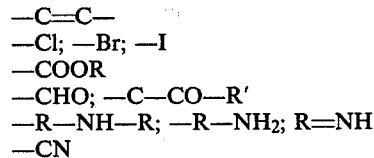

—CN

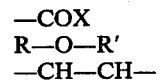

R—O—R'

—CH—CH—

In these formulae R and R' represent alkyl or aryl groups and X represents a "leaving group", such as halide, carboxyl, azide, tosylate, sulfonate or other functionality as described, for example, in E. S. Gould, *Mechanism and Structure in Organic Chemistry*, Holt, Rinehart & Winston, 1959, pages 250–263, especially p. 261.

Some of these site-reactive groups require a catalyst in order to react with the mineral surface, some don't. An example of the ones that do is the olefinic double bond. It requires a protonic acid or a Lewis acid. A protonic acid is any material that is capable of liberating a hydrogen ion, i.e., a conventional acid such as a mineral acid or carboxylic acid. The Lewis acid is an electron-accepting material such as $BF_3$, $AlCl_3$, $SbCl_5$, etc. These acid catalysts will also accelerate the reaction of the esters, aldehydes, ketones, imines, nitriles and alcohols shown as possible site-reactive groups, but they are only absolutely required for the olefins.

Since the ultimate purpose of the invention is to provide mineral reinforcements which reinforce polymer compositions, the polymer-interacting component of the organic compound must be one which will interact appropriately with the polymer matrix which is to be reinforced. The appropriate interaction is one which produces adhesion between the reinforcement and the polymer matrix, and most especially, it is the strong adhesion produced by the entanglement of polymer chains in the polymer-interacting group with similar polymer chains in the polymer matrix. For example, grafting of high molecular weight polypropylene to the surface of the filler provides the result that when the treated filler is processed with lower molecular weight polypropylene the polypropylene grafted to the filler entangles the polypropylene of the matrix, forming a bond as strong as the tensile strength of the polypropylene matrix between the filler and the matrix. A more dissimilar polymer, such as polyethylene, may be used for the graft and will still result in interaction with the polypropylene due to wetting and polar or non-polar interactions of the two polymers, the one of the matrix and the one bound to the surface of the mineral.

The general subject of polymer compatibility, or molecular solution or entanglement, has been extensively treated by various authors, as, for example, in the two-volume publication *Polymer Blends*, edited by D. R. Paul and Seymour Newman, Academic Press, New York, NY, 1978. A normal test of polymer compatibility involves mixing two polymers intimately by melt or solution mixing and observing whether the glass transitions of each are preserved or the material exhibits only one coalesced glass transition. In the latter case, the polymers are compatible; that is, they are molecularly mixed. Such molecular mixing between the grafted polymer and the polymer matrix is a sufficient but not a necessary condition for the practice of this invention. Our data establish that benefits in properties of the composite result even from the lesser interactions exhibited by incompatible polymers such as S-B-S thermoplastic elastomers and polypropylene.

Thus, any pair of compatible copolymers is suitable for use as matrix and polymer interactive segment according to this invention. For various classes of materials such as "polar" or "non-polar", "saturated" or "unsaturated" polymers, two polymers taken out of the same single group of the above-quoted groups are likely to be suitable as matrix and polymer interactive materials as well.

It has been found especially useful to employ as the polymer-interactive component suitable for reinforcing hydrocarbon polymer matrices, one of several types of hydrocarbon block copolymers. These compositions are well known thermoplastic elastomers, many of them commercially available, and are described, i.a. in numerous patents. One group of such polymers consists of linear block copolymers having polystyrene end blocks and polybutadiene or polyisoprene center blocks and the products obtained by partial hydrogenation of such copolymers to produce polymers having primarily polystyrene end blocks and hydrogenated polybutadiene center blocks. Reference for the preparation and compositions of such polymers may be made to U.S. Pat. No. Re. 28,236 and U.S. Pat. Nos. 3,595,942, 3,810,957, 4,208,315 and 4,242,470. As explained therein, polystyrene-polybutadiene-polystyrene and polystyrene-polyisoprene-polystyrene block copolymers may be abbreviated "S-B-S" and "S-I-S", respectively, and their derivatives in which the center block is hydrogenated may be designated "S-EB-S" and "S-EP-S", respectively. Molecular weights of the blocks in the ranges disclosed in said patents tend to be useful in this invention. Another related block copolymer is of the type S-(SB)-B-(BS)-S, which is disclosed in U.S. Pat. Nos. 3,906,057, 3,906,058, 3,907,929 and 3,907,931. In this case, (SB) and (BS) refers to so-called "tapered" polymer structure, which consists of molecules or blocks in which at one end there is a chain of essentially only one type of monomer and units of the other monomer are present at increasingly greater frequency until at the other end of the block or molecule there is a random distribution of the two monomers. Still another type of useful block copolymer is a tapered two-block polymer having, for example, about 30% styrene and 70% butadiene content, the polybutadiene component having about 10% vinyl structure.

The relevant disclosures of the above referred to patents are incorporated herein by reference.

The modified reinforcements of the present invention are useful in blends with various thermoplastic polymers. Thermoplastic polymers contemplated herein include, without limitation: polystyrene-based polymers, copolymers, and graft copolymers; polyolefin-based polymers and copolymers; nylons; poly(ethylene terephthalate); poly(butylene terephthalate); acrylonitirle-butadiene-styrene terpolymers, polyketones, poly(phenoxy), poly(aryl ether), poly(aryl ester) and polyurethane. The following represents appropriate choices of polymer-interacting segments for given polymer matrices.

| Matrix | Polymer-interacting segment |
| --- | --- |
| Polyolefin e.g., polyethylene, isotactic polypropylene, isotactic polybutylene, etc. | Polyolefin e.g. linear polyethylene, polypropylene, etc., including plastic or elastomeric random and block copolymers. The monomer need not be identical to that of the matrix polymer, so long as the segment is capable of being dispersed in the matrix polymer in melt form. |
| Poly(vinyl arene) homopolymers and copolymers; e.g., polystyrene; ABS, SAN, etc. | Block polymers A-B or A-B-A where B is a polydiolefin, e.g., polybutadiene or polyisoprene and A is a poly(vinyl arene), e.g., polystyrene; poly(vinyl arene) homopolymers and copolymers; .e.g., polystyrene, ABS, SAN, etc. |
| Polyesters e.g., polybutylene terephthalate (PBT), polyethylene terephthalate (PET) | PBT or PET |
| Poly(phenoxy) | Polyphenoxy |
| Poly(aryl ether) | Poly(aryl ether) Polyaryl, e.g., polystyrene |
| Nylons | Polyamide; polyurethane |
| Polyurethane | Polyurethane; polyamide; molecules containing groups capable of grafting reaction with polyurethane, e.g., epoxy or —NH$_2$. |

A preferred combination comprises hydrocarbon polymers reinforced with compositions of this invention in which the polymer-interacting segment is a hydrocarbon, resulting from use of a hydrocarbon polymer in the preparation of the reinforcing mineral composition.

Methods of preparation

Various methods of preparing the compositions of this invention may be employed. A first mode of preparation involves the acid catalyzed reaction of an olefinic double bond contained in a polymer with a mineral surface. A second mode comprises nucleophilic attack of a mineral substrate on a polymer which contains a group labile to nucleophilic attack. A third mode comprises a nucleophilic attack by a polymeric material on a susceptible bond in a mineral reinforcement. The following are preferred methods illustrating each of these modes.

In the first mode of preparation, the reactive site contains oxygen and the site-reactive component of the organic molecule is an olefinic double bond which is capable of being protonated. This bond may be isolated, conjugated with another double bond, or may occur in an aromatic ring. The various substituents and the type of double bond will affect its reactivity, but all double bonds are potentially reactive. A composition according to the invention is prepared, for example, by contacting the mineral component which has reactive surface oxygen atoms or oxygen-containing groups with an oxygen-reactive compound under conditions at which at least one olefinic double bond of the compound will react with a surface oxygen or oxygen-containing group.

An additional aspect of this mode of preparation is the comparative ease with which a controlled level of gel or cross-linked structure may be introduced into the grafted, polymer site reactive block or group.

In the second mode of preparation, the reactive site contains reactive oxygen atoms or groups and the site-reactive component of the organic molecule is a substituent atom or group which is capable of nucleophilic displacement by reactive oxygen. A composition according to this invention is prepared by contacting the mineral component which has reactive surface oxygen with such an oxygen-reactive compound under conditions at which at least one of said substituent atoms or groups per molecule is displaced by a surface oxygen atom from the mineral surface; this creates a covalent bond between the surface and the organic molecule.

In the third mode of preparation a reactive site labile to nucleophilic attack is generated on the mineral surface.

In this mode, the site-reactive component of the organic molecule is a substituent atom or group which is capable of attacking the displaceable moiety on the surface of the mineral.

The displaceable moiety on the surface of the mineral may be for example a hypobromide (—OBr), hypochloride (—OCl), thionyl chloride (—OSOCl), chloride (—Cl) or siloxane (Si—O—Si) group formed, respectively, by reaction of the mineral with halogen (Br$_2$ or Cl$_2$), thionyl chloride (SOCl$_2$), decomposition of the surface thionyl chloride groups to eliminate SO$_2$, or drying of the mineral to eliminate chemisorbed water. The site-reactive component of the organic molecule is a substituent atom or group which is capable of attacking the displaceable halogen, oxygen or sulfur moiety on the surface of the mineral. Examples of such groups are amines, alcohols, acids, esters, ethers, and organometallic species such as living polymers composed of polyolefins terminated with a carbon-lithium bond or other organometallic bond. In the case of the organometallic reagents it is preferred to use living polymers terminated with lithium; however, magnesium, potassium, sodium or mercury or other metal species could be expected to react similarly.

The use of any of the reactions outlined in modes 1, 2, or 3 will automatically produce a layer which characteristically, as evaluated by electron spectroscopy for a chemical analysis (ESCA) will be in the range of about 5 to 500 Angstroms in thickness, and typically between 10 and 100 Angstroms in thickness. The cause of this self-limiting thickness is not known with certainty. It is believed that it may be due to saturation of the surface reactive sites on the mineral with site interactive groups on the polymer, leaving a mineral surface covered with the polymer interactive tails and the site interactive materials in such a way that it is impossible for further attack on the surface to occur. Not every site on the mineral, therefore, may be reacted and the polymer interactive chains left on the surface will not be interactive with the site reactive groups left in solution.

In said first mode, involving the reaction of a protonated or activated olefinic double bond of an organic compound with a surface oxygen bond to a metal atom "M" of the mineral surface, typically silicon, the resulting covalent bond may be represented by

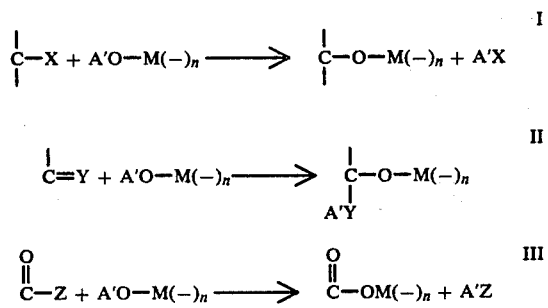

where "$(—)_n$" represents the appropriate number of bonds between M and other atoms of the mineral surface and where at least one of the bonds of the carbon atom connects to a relatively high molecular weight polymer-interacting group "~".

Some illustrative reactions of a substituent atom or group "X" of an organic compound with a surface oxygen bound to a metal atom "M" of the mineral surface according to said second mode may be represented by the following equations:

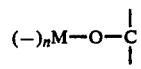

In the above equations:
  ~ = a polymer interactive group
  $(—)_n$ = bonds between M and other atoms of the mineral surface
  M = a metal atom of the mineral surface, preferably Si or Al, but including other metals of Groups II–VIII of the Periodic Table.
  A' = typically H$^+$, Na$^+$ or K$^+$
  X = halogen, carboxyl, azide, tosylate, or other leaving group, as previously described
  Y = O or N
  Z = X, —OR, —NR$_2$ or —OH
  R = a hydrocarbyl group.

The reaction between the reactive site and the site-reactive component of the organic compound according to the third mode may be represented by the following equations:

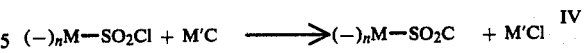
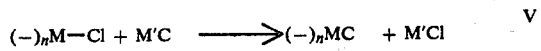

-continued

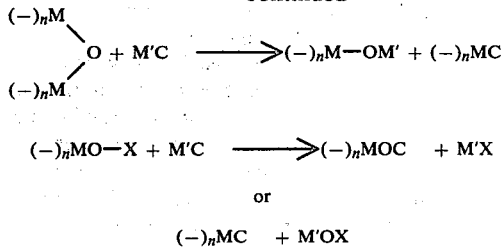

$$(-)_nMO-X + M'C \longrightarrow (-)_nMOC + M'X \quad \text{VII}$$

or $$(-)_nMC + M'OX$$

The following illustrates in more detail some methods of reacting site interactive groups with site reactive groups on the mineral surface according to three modes discussed above.

In the first mode, a double-bond containing polymer is dissolved in a hydrocarbon solvent. The polymer may be a material such as a styrene-butadiene block copolymer, a polybutadiene rubber, an EPDM rubber or other polymeric species containing double bonds. To this solution is added a strong Lewis acid, such as aluminum trichloride or a strong protonic acid such as trifluoromethane sulfonic acid or paratoluenesulfonic acid. After the addition of the acid catalyst, the solution will have turned dark red or orange, indicating the formation of protonated double bonds on the polymer species. A variety of acids, essentially any strong acid, may accomplish this protonation. Sulfuric acid or other mineral acids will be used in anhydrous condition. Once the solution contains the protonated polymer, the mineral species may be added directly to the solution, in which case a reaction between basic oxygen groups on the surface of the mineral and the protonated olefin will ensue. Alternatively, the mineral may be combined with the polymer solution and the acid added second, in which case the olefin, as it is protonated, will be rapidly taken up by the mineral. Conditions of temperature, pressure and time of reaction are not critical. A preferred range involves heating of the solution to give greater polymer mobility; temperatures in the range of 60°–80° C. and a contact time of 15 minutes to several hours would typically be used, although other temperatures and contact times will give the reaction.

To illustrate the second mode, an organic polymer containing hydroxyl groups, such as for example, polyvinylalcohol, or an ester, as for example polymethylmethacrylate, or a halide such as polyepichlorohydrin or brominated polypropylene, or a nitrile, such as polyacrylonitrile, or an aldehyde or ketone containing material, such as polyvinylbutyrate, or another polymer which contains reactive sites, is dissolved in any solvent suitable for the purpose, but especially hydrocarbon solvents, and contacted with the mineral with heating to drive the reaction. A catalyst, e.g., an acid catalyst as the ones described with respect to the first mode, may accelerate the rate of reaction but is not necessary to achieve the reaction. The reaction is suitably effected by heating the solution of the polymer to temperatures of 40°–150° C. for a time of 30 minutes to several hours. Upon completion of the reaction, the polymeric materials will, as in the first mode, be covalently bound to the surface of the mineral and will not be extractable by exhaustive solvent extraction.

To illustrate the third mode, a mineral such as mica or glass is treated with thionyl chloride in the presence or absence of a solvent. Analysis of the surface of the mineral will reveal a mixture of thionyl chloride groups containing $SO_2$ bound to the surface and groups in which the $SO_2$ has been cleaved out, leaving chlorine bound directly to the surface. This mixture of groups will react with a variety of materials containing nucleophilic centers, such as alcohols, amines and organometallic reagents. Especially the chlorinated surface of a mineral prepared by reaction of the mineral with thionyl chloride will react readily with living cement of styrene-butadiene block copolymers and other metal terminated organic polymers. These living cements are solutions of polymeric organometallic reagents dissolved in a hydrocarbon medium, such as are used in the preparation of thermoplastic elastomers and in some other processes. On exposure of the chlorinated mineral surface to the polymeric living cement, a rapid reaction occurs in which the living anion disappears and the polymeric graft appears on the surface of the mineral. In this case, this polymeric living cement must be prepared separately and then combined with the mineral. This is to say, under normal practice the polymeric living anionic cement could not be prepared in the presence of the mineral.

As shown in the illustrative examples, the fully-prepared solids were generally given multiple washes with a hydrocarbon solvent, typically the same as that in which the product had been prepared. Such washes are desirable in a study of the methods of preparation, since they remove non-grafted polymeric material. However, such removal of non-grafted material by means of solvent washes is not essential to practice of the invention.

The invention is further illustrated by the following examples. These are given for the purpose of illustration only and are not meant to limit the invention to the particular reactants and conditions employed therein.

The following materials were employed in a number of the examples and are therefore referred to by an abbreviated designation for ease of reference.

Substrates

M-1 Phlogopite Mica (nominally 60 mesh)-Sieve analysis in Table 1

M-2 Phlogopite Mica (nominally 200 mesh)-Sieve analysis in Table 1

M-3 Phlogopite Mica (nominally 320 mesh)-Sieve analysis in Table 1

M-4 Glass Fibers-"E-Glass"⅛ inch long, 13 micron diameter

Organic Compounds

O-1 S-B-S Block Copolymer-Commerical polymer; nominal styrene:rubber weight ratio=30:70

O-2 S-EB-S Block Copolymer-Commerical polymer; nominal styrene:rubber weight ratio=29:71

O-3 B-S "Tapered" Two-Block Copolymer-Commercial polymer; nominal styrene:rubber weight ratio=29:71

O-4 S-(SB)-B-(BS)-S Block Copolymer-Nominal molecular weights of the blocks $(\times 10^{-3})$=67-30-260-30-67

O-5 Polystyrene-Commercial crystal grade-melt flow range 2-3

O-6 Polypropylene-Commercial product-nominal melt flow 5

O-7 EPDM Elastomer-Commercial product; ethylene-propylene-norbornene terpolymer

O-8 p-Bromobenzoyl chloride

O-9 p-Bromobenzyl bromide

O-10 Benzoyl chloride

O-11 Liquid epoxy resin-Commercial epoxy resin=primarily the diglycidyl ether of 2,2-bis(4-hydroxyphenyl)propane; molecular weight between 350 and 370

O-12 Acetone

O-13 "Living Polymer" of lithium-terminated polystyrene; nominal molecular weight 30,000

O-14 "Living Polymer" of lithium-terminated S-B; nominal molecular weight of the blocks ($\times 10^{-3}$) 30–100

Catalysts, Acid Acceptors and Chemical Reagents

C-1 Triflic Acid (Trifluoromethane sulfonic acid)
C-2 $AlCl_3$
C-3 p-Toluene sulfonic acid
C-4 Fuming sulfuric acid
C-5 Pyridine
C-6 Dibutyl tin laurate
C-7 Bromine
C-8 Thionyl chloride Solvents S-1 Toluene
S-2 Cyclohexane
S-3 Methylethyl ketone
S-4 Diethyl ether
S-5 Bromobenzene
S-6 Benzene

TABLE 1

MINERAL SUBSTRATE - MICA
Hammer-milled Phlogopite Mica
Sieve Analyses

| | Weight % Retained on Sieve | | |
|---|---|---|---|
| | Substrate No. | | |
| Mesh | M-1 | M-2 | M-3 |
| +50 | 21.1% | | |
| +70 | 39.2% | | |
| +100 | 27.3% | | |
| +140 | 9.05% | 18.45% | 1.95% |
| +200 | 2.0% | 20.00% | 8.75% |
| +325 | 0.85% | 23.10% | 34.75% |
| +400 | | 5.60% | 36.45% |
| +20 Microns | | | 15.8% |
| +20 Fines | 0.5% | 32.85% | 2.8% |
| Aspect Ratio | 63 | 60–70 | 20–30 |

Determination of thickness of polymer interactive layers on reinforcement substrates The technique used to analyze the surface layers discussed in this application was X-ray photoelectron spectroscopy (XPS), also known as "Electron Spectroscopy for Chemical Analysis" (ESCA). In this technique, a material is bombarded with X-rays which eject photoelectrons from the core levels of the atoms in the substrate material. The energy of these electrons is determined by the energy levels of the electrons in the various atoms and the distribution of electrons of various energies is determined by the numbers of different types of atoms present and the response of each of the various electrons in the atom to that particular type of X-ray. It is well known that the response factors of the various elements may be tabulated and elemental analysis may be performed on surfaces by using this equipment. The various types of reinforcements described in this patent application have been analyzed by ESCA. By comparing the ESCA results obtained on (1) an untreated substrate, (2) a substrate after treatment, as described in the examples, to react it with an organic molecule; and (3) a substrate after such treatment, followed by contact with solvents under conditions at which coatings which are not chemically bound would be removed, it has been determined that the elements of the polymer interactive materials are incorporated on the surfaces of the reinforcement materials by chemical bonding—that is, in such a way that they cannot be washed off or extracted by appropriate solvents. In addition to this determination, the thickness of these layers has been estimated by comparing the relative attenuations of two different electrons from the same element. The apparent layer thicknesses determined by this technique are not necessarily accurate but permit comparison of the thickness of organic coatings on an inorganic substrate in different samples, provided that the organic coating is uniformly distributed in a film of constant thickness and that the element being used for the analysis is uniformly distributed in the inorganic substrate. Based on these assumptions, the data observed for any polymer interactive grafted layers are reproducible, although it cannot be said with certainty what the exact thickness is. Thus it is possible that the layers cited as being 20 Angstroms might indeed be 40 or 50 Angstroms.

The range of 5–500 Angstroms, which is disclosed herein as being the average thickness of the co-valently bound organic molecules, is thought to be sufficiently broad to take account of this lack of precision in measurement. In any event, it contrasts with a thickness of the order of about one-half micron (5000 Angstroms) characteristic of coatings such as applied by precipitation from solution or conventional silane sizings.

Another method of employing ESCA for approximate determination of layer thickness is by determination of the ratio of the various surface atoms. For example, one can compare the amount of carbon on the surface with the amount of silicon on the surface to get an approximation of the amount of hydrocarbon polymer deposited on a silicon-containing mineral. In many cases, this and the previously described technique, once calibrated to agree at an initial point, were found to agree over a wide range of materials. In some cases there was some variance between the results of the two methods. The reported value is an average of the two techniques. Illustrative ESCA data for various kinds of materials prepared in the manner of some of the examples are presented in Tables 2–4.

PREPARATION ACCORDING TO MODE 1

Example 1

| Mineral Substrate | M-1 | Mica |
| Organic Compound | O-1 | S-B-S |
| Catalyst | C-1 | Triflic Acid |
| Solvent | S-1 | Toluene |

141.1 g of block copolymer O-1 was charged with 3100 cc dried industrial grade toluene (S-1), to a 4 liter resin kettle, stirred under nitrogen, and warmed to dissolve the block copolymer. 1022.7 g of as received mica M-1, dried in a vacuum oven for 2½ hours, was poured into the resin kettle under moisture-free conditions. The hot mixture was stirred under nitrogen at about 80°–100° C. for one hour. Two cc of acid catalyst C-1 was added to 30 cc toluene in a dry box and shaken to mix, forming a cloudy, yellowish solution. Fifteen cc of the solution was injected with a syringe into the hot stirred mica suspension. The mica suspension was stirred for 20 minutes and the last 15 cc of catalyst solution injected. The mixture was refluxed for 1 hour at atmospheric pressure and about 111° C. 1.8 liters liquid was sucked off of the mica through a 100-mesh screen. Two liters fresh toluene was added, the suspension stirred and left overnight under nitrogen flow. The following day, 1.3 liters toluene was sucked off, 2 liters fresh toluene added, the suspension stirred, 2 liters toluene sucked off, and this washing procedure repeated two more times. The mica was sucked dry, transferred to a vacuum oven, left overnight at 30" of mercury vacuum at 50° C. The following morning the mica was completely dry. The mica was passed through a No. 10 screen with a rubber stopper to disperse the clumps which formed in the bottom of the evaporating crystallizing dish. 1 kg mica was recovered.

Example 2

| Mineral Substrate | M-1 | Mica |
|---|---|---|
| Organic Compound | O-5 | Polystyrene |
| Catalyst | C-1 | Triflic Acid |
| Solvent | S-1 | Toluene |

In a 4 liter resin kettle, 100 g of crystal polystyrene (O-5) in 3100 cc dried toluene (S-1) was stirred and warmed under nitrogen to dissolve the polystyrene. Two cc of acid catalyst C-1 in 60 cc dry toluene was added slowly to the warm polystyrene solution under nitrogen, turning the solution pale yellow. 1005 g of mica (M-1), dried in a vacuum oven, was immediately added to the stirred acid mixture under moisture-free conditions. The mixture was stirred for 30 minutes with warming and a second solution of 2 cc C-1 and 60 cc toluene added. The mixture was brought to reflux for an hour and filtered hot with a 16 mesh filter. The resulting suspension was washed several times with toluene, as in Example 1. The resultant mica looked exactly as received mica—it appeared very dry, no adhesion noted between flakes. Example 3

| Mineral Substrate | M-2 | Mica |
|---|---|---|
| Organic Compound | O-4 | S-(SB)-B-(BS)-S |
| Catalyst | C-1 | Triflic Acid |
| Solvent | S-1 | Toluene |

50 g of block copolymer O-4 was dissolved in 300 ml toluene (S-1) in a 4 liter resin kettle. 5 cc of acid catalyst C-1 was dissolved in 150 ml toluene in a dry box. The solution of polymer together with 1000 g of dry mica M-2 and the catalyst solution was charged into the resin kettle. The mixture was refluxed 2 hours and let cool overnight under nitrogen blanket. The mica was washed several times with toluene. After washing, the mica was air dried on a filter funnel and vacuum dried in the oven at 30" mercury overnight, and passed through a 50 mesh screen.

Example 4

| Mineral Substrate | M-4 | Glass Fiber |
|---|---|---|
| Organic Compound | O-4 | S-(SB)-B-(BS)-S |
| Catalyst | C-1 | Triflic Acid |
| Solvent | S-1 | Toluene |

25 g of block copolymer O-4 was charged with 3200 ml toluene (S-1) to a dry 4 liter resin kettle under nitrogen. The copolymer was dissolved with heating and stirring. 1 cc of acid catalyst C-1 was added to 30 ml toluene in the dry box, making a pale yellow solution. The solution was added to the copolymer solution over 5 minutes, giving an orange-colored solution. The warm solution was stirred for an hour. 125 g of glass substrate M-4, heat cleaned by burning in a glass furnace, was added to the solution. The mixture was refluxed for 2 hours and the red solution sucked off of the glass through a 100 mesh screen. The glass was washed several times with toluene and filtered on a Buchner funnel.

Examples 5–9

The following solids are prepared similarly to the method of Example 1.

| Example | Mineral Substrate | | Organic Compound | Catalyst | Solvent |
|---|---|---|---|---|---|
| 5 | Mica | M-1 | Block Copolymer O-3 | Acid C-1 | S-1 |
| 6 | Glass | M-4 | Block Copolymer O-1 | Acid C-2 | S-1 |
| 6A | Glass | M-4 | Block Copolymer O-1 | None | S-1 |
| 7 | Mica | M-1 | Block Copolymer O-1 | Acid C-3 | S-1 |
| 8 | Glass | M-4 | Block Copolymer O-1 | Acid C-1 | S-1 |
| 9 | Mica | M-1 | EPDM Elastomer O-7 | Acid C-1 | S-1 |

PREPARATIONS ACCORDING TO MODE 2

The following examples 10 to 17 illustrate, by use of model compounds, the types of reactions that are possible between reactive sites on the mineral surface and site-reactive groups such as may be present on a polymer molecule. Examples 18 to 20 and embodiments -A-C illustrate methods of producing polymer interactive coatings according to this invention based on some of the chemical reactions illustrated in examples 10–17. In Examples 10–17, the solid substrates, prior to reaction, were heated in a glass cleaning oven. Mica was heated at 400° C. and glass at 470°–500° C.

Example 10

| Mineral Substrate | M-1 | Mica |
|---|---|---|
| Organic Compound | O-8 | p-Bromobenzoyl chloride |
| Acid Acceptor | C-5 | Pyridine |
| Solvent | S-2 | Cyclohexane |

10.4 grams of heat cleaned mica and 0.6 grams of p-bromobenzoyl chloride, 250 cc of cyclohexane, and 1 cc of pyridine were charged, in that order, into a 500 cc round bottom flask. The mixture was refluxed for 45 minutes, filtered hot, washed with 500 cc of dry cyclohexane in 25 cc portions, and the filtrate dried in a desiccator overnight.

Example 11

| Mineral Substrate | M-1 | Mica |
|---|---|---|
| Organic Compound | O-8 | p-Bromobenzoyl Chloride |
| Solvent | S-4 | Diethyl ether |

10 Grams of heat cleaned mica and 0.9 grams p-bromobenzoyl chloride were weighed into a 500 cc round bottom flask. 250 cc of anhydrous diethyl ether was added and the mixture refluxed for 45 minutes and then filtered hot under vacuum, washed with 400 cc ether in approximately 40 cc portions, then washed with 250 cc cyclohexane and dried overnight in a desiccator.

Example 12

| Mineral Substrate | M-1 | Mica |
| Organic Compound | O-9 | p-Bromobenzyl bromide |
| Solvent | S-1 | Toluene |

9.9 Grams of heat cleaned mica was charged with 1.2 grams p-bromobenzyl bromide into a 500 ml round bottom flask and 250 cc dry toluene added. The mixture was refluxed for 20 minutes with stirring, filtered hot under vacuum, washed on a vacuum funnel with 250 cc toluene in 30 ml portions, and dried in a vacuum desiccator.

Example 13

| Mineral Substrates | M-1, M-2, M-3 | Mica |
| Organic Compound | O-11 | Epoxide resin |
| Solvent | S-1 | Toluene |

63 Grams of a commercial liquid epoxy resin was charged into a 250 ml round bottom flask, covering a charge of heat cleaned mica. The mixture was heated to 160° C. for 2 hours, washed with toluene with stirring on a vacuum filter and dried overnight in a desiccator.

These preparations were repeated with micas M-1, M-2 and M-3; a similar preparation was made at 100° C. temperature.

Example 14

| Mineral Substrate | M-4 | Glass Fibers |
| Organic Compound | O-10 | Benzoyl chloride |
| Acid Acceptor | C-5 | Pyridine |
| Solvent | S-2 | Cyclohexane |

5 Grams of heat cleaned glass was placed in a 250 ml flask. A mixture of 60 cc of cyclohexane and 0.5 cc benzoyl chloride was added to the flask. After the glass had been wetted, 0.05 ml pyridine was added. An additional 100 ml cyclohexane was added and the mixture refluxed 2 hours, filtered and washed under nitrogen on a vacuum funnel, and dried in a vacuum desiccator overnight.

Example 15

| Mineral Substrate | M-4 | Glass Fibers |
| Organic Compound | O-8 | p-Bromobenzoyl chloride |
| Acid Acceptor | C-5 | Pyridine |
| Solvent | S-2 | Cyclohexane |

0.45 Grams of p-bromobenzoyl chloride was charged to a 100 cc flask containing 100 cc cyclohexane and 0.5 cc pyridine. 5 grams of heat cleaned glass was added to the cloudy solution. The mixture was refluxed 2 hours, filtered, and dried in a vacuum desiccator.

Example 16

| Mineral Substrate | M-4 | Glass Fibers |
| Organic Compound | O-12 | Acetone |

5 Grams of heat cleaned glass was placed in a 250 ml round bottom flask with 80 cc of acetone. Acetone was refluxed 2 hours and drained off. The glass was filtered and washed and placed in a vacuum desiccator overnight and stored in a dry box.

Example 17

| Mineral Substrate | M-4 | Glass Fibers |
| Organic Compound | O-11 | Epoxide resin |
| Catalyst | C-6 | Dibutyl tin laurate |
| Solvent | S-2 | Cyclohexane |

5 Grams of heat cleaned glass was placed in a 250 ml round bottom flask. A mixture of 80 cc of cyclohexane, 0.3 cc of a commercial liquid epoxy resin and 0.04 cc dibutyl tin dilaurate was charged into the flask. The mixture was refluxed 2 hours and then cooled for 3 hours. The glass was filtered on a vacuum funnel, washed 3 times with cyclohexane under nitrogen, and dried overnight.

The following illustrates production of polymer reinforcing compositions of this invention based on some of the reactions illustrated in Examples 10 to 17.

Example 18

| Mineral Substrate | M-1 | Mica |
| Organic Compound | O-7 | EPDM elastomer |
| Reagent | C-7 | Bromine |
| Solvents | S-5 and S-6 | Bromobenzene and Benzene |

A 250 ml round bottom flask fitted with heating mantle, nitrogen blanket and reflux condenser was charged with 100 ml of bromobenzene and 5.0 grams of polypropylene. The mixture was heated, and stirred with a Teflon stir bar. After 3 hours most of the polypropylene appeared to have dissolved; the skin temperature of the heating mantel was 180° C. At this point 100 ml of hot benzene was added to dilute the bromobenzene. 0.5 grams of bromine was added to the solution, which turned red-orange, making the undissolved polypropylene clearly visible. The reaction was carried out under fluorescent lights, since the bromination of polypropylene is activated by light. The solution was poured into a 4 liter nitrogen flushed resin kettle preheated to 100° C., through a 100 mesh screen which sieved out 0.19 grams of undissolved polypropylene. 3.1 liters of hot benzene was added to the solution, which was now yellow. Four microdrops of bromine, totaling 0.15 grams, were added and the solution turned orange. The reinforcement material to be grafted was then suspended in the resin kettle and the mixture stirred under reflux for a period of 30 minutes to 4 hours. The reinforcement material was then removed from the liquid and washed with 150 ml of hot bromobenzene, followed by 4 washes with 300 ml of hot benzene. The material was then sucked dry on a filter and allowed to dry in a stream of nitrogen overnight.

ESCA studies of the mica treated substantially as in the described preparation confirmed the presence of a polymeric layer which could not be removed by extraction with benzene or bromobenzene in a Soxhlet extractor.

The following illustrates a preparation based on the chemistry of Example 18, but using a different polymeric reagent.

Example 19

| Mineral Substrate | M-1 | Mica |
|---|---|---|
| Organic Compound | O-2 | S-EB-S |
| Reagent | C-7 | Bromine |
| Solvent | S-6 | Benzene |

A dried 4 liter resin kettle, blanketed with nitrogen, was charged with 3 liters of benzene and 30 grams of the S-EB-S copolymer O-2. The resin kettle was heated with stirring to 70° C. to dissolve the polymer, which was readily soluble in benzene. At this point 3 grams of bromine (0.019 moles) was added, turning the solution red. The reaction was carried out under fluorescent lights. After 40 minutes the reinforcement material was added to the solution, which was heated to reflux and refluxed for a period of 40 minutes to 1½ hours. The reinforcement material was removed and washed as described previously and dried under nitrogen overnight.

Example 20

| Mineral Substrate | M-1 | Mica |
|---|---|---|
| Organic Compound | O-7 | EPDM elastomer |
| Reagent | C-7 | Bromine |
| Solvent | S-1 | Toluene |

In a 4 liter resin kettle 50 grams EPDM elastomer O-7 was dissolved in 3000 ml of dried toluene. The dissolution occured over 3 hours at 70° C. 3 grams of bromine was added to the solution; the reaction was carried out in the dark to prevent free radical attack on the saturated backbone of the polymer. After the bromine was added to the polymer solution, 1 kg of mica M-1 was added to the stirred solution over 12 minutes. The solution was stirred in the dark for two more hours and then refluxed for about 1½ hours. The solution was allowed to sit overnight and then sucked off of the mica. The mica was then washed 4 times with 2 liter portions of dry toluene at 60° C. The next day the mica was again washed with 2 liters of dry toluene, transferred to a large Buchner funnel, and washed with 3 one-liter portions of dry toluene and dried at 50° C., 30 inches of vacuum overnight in a vacuum oven. The yield was 950 grams recovered of grafted mica.

Additional Illustrative Embodiments According to Mode 2

Embodiment A: Reaction of Examples 10 and 11

Examples 10 and 11 illustrate by means of model compounds reactions useful in producing other polymer reinforcing composites.

In the preparation of such polymer reinforcements, a polymer containing an acid chloride, such as obtained by converting methyl methacrylate or other acrylate monomers copolymerized with any other vinyl polymerizable monomers, such as styrene, acrylonitrile or butadiene, to the acid halide, is reacted with a mineral substrate according to these examples. The ester itself is also likely to be reactive following the same technique used for the acid chlorides. The resulting solids are useful as reinforcement in polymers of the same type as used in the preparation of the modified substrate, or in polymers of the same type as blocks present in the polymers used in preparation of the modified substrate.

Embodiment B: Reaction of Example 12

Chloromethyl methylating agents can be used with polymers containing olefinic or aromatic rings to yield chloromethyl groups equivalent to benzyl chloride, which react the same way as the benzyl bromide. The technique for doing this is described in papers by R. B. Merrifield and others. A brief review of this chemistry may be found in J. M. Stewart and J. D. Young "Solid Phase Peptide Synthesis", W. H. Freeman & Co., 1969. A well-known technique for treating polystyrene with chloromethyl methyl ether and a tin catalyst such as tin tetrachloride and introducing a $CH_2Cl$ group on the aromatic ring of the polystyrene is described in this reference. This treated polystyrene or polyolefin will react with the mica or glass or other reinforcement similarly to benzyl chloride or similarly to brominated polyolefin.

Embodiment C: Reaction of Example 13

Example 13 illustrates by means of a model compound a reaction useful in producing a polymer reinforcing composite particularly suitable for use in reinforcing thermoplastic phenoxy resins, i.e., resins having chains of groups of the structure

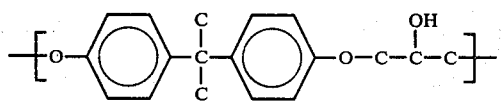

which may be terminated with epoxy groups and have molecular weights of the order of 40,000.

In the preparation of such polymer reinforcements, a polyepoxide resin such as a higher molecular weight solid epoxy resin produced from epichlorohydrin and 2,2-bis(4-hydroxyphenyl)propane (Bisphenol A) is dissolved in a suitable solvent, such as a ketone, and permitted to react with a solid substrate such as mica or glass as in Examples 13 and 17, typically at temperatures between 50° and 150° C., depending on the solvent used. The resulting solid is thereafter recovered, washed and dried as described above.

Other reactions cited previously can be applied to polymeric reagents; a polymer containing an ester, acid halide, ketone, aldehyde, imine, etc., will react as the small molecule containing those functionalities has been shown previously to react.

PREPARATION ACCORDING TO MODE 3

Examples 21–22

| Pretreatment of the Substrate | | |
|---|---|---|
| Mineral Substrate | M-1 | Mica |
| Reagent | C-8 | Thionyl chloride |
| Solvent | S-1 | Toluene |

A 4 liter resin kettle, dried and flushed with nitrogen, was charged with 2 liters of toluene dried over a molecular sieve. 500 grams of mica M-1, dried overnight in a vacuum oven at 30 inches of mercury and 120° C., was charged to the toluene. A solution of 20 grams of thionyl chloride (168 mmoles) in 12 ml of dried toluene was made up in a dry box. This solution was added dropwise to the rapidly stirred mica suspension over a period of 30 minutes. After the addition was finished, the resin kettle was heated for a period of 40 minutes, at which point the color in a trap with acid indicator, fitted to the exit nitrogen line, had faded, indicating that the theoretical amount of HCl had been evolved by the reaction of the thionyl chloride with the hydroxyl groups on the surface of the mica. The final temperature of the skin of the kettle was 137° C. The mixture was then refluxed for 2 hours, a distillation head was attached and excess thionyl chloride and toluene were distilled off of the mica. The mica was then heated over a period of 2½ hours at 200° C. with nitrogen admitted to the bottom of the mass through a stainless steel tube to completely dry the mica and evolve the vapors resulting from decomposition of SOCl moieties on the surface of the mica. The mica was then divided into 3 150 g. samples and stored under nitrogen in wide mouth bottles.

Example 21

| Preparation of Reinforcement from Pretreated Substrate | | |
|---|---|---|
| Mineral Substrate | M-1 | Pretreated as described |
| Organic Compound | O-13 | Lithium-terminated polystyrene |
| Solvent | S-2 | Cyclohexane |

150 g of mica, treated with thionyl chloride as described, was removed from the dry box and moistened with 186 g of dried cyclohexane in a 500 cc round bottom flask, stoppered with a serum cap. 216.2 g of a living polymer cement containing 9.63% solids (O-13), which was a living polystyrene polymer of 28,000 to 32,000 (nominal 30,000) molecular weight, dissolved in cyclohexane, was added through the serum cap to the mica in the flask. The red color of the living cement was immediately quenched by reaction with the mica, indicating that the grafting reaction appeared to be quickly complete at room temperature. The mixture was heated for 2½ hours at 60°-70° C. with occasional mixing to be certain the reaction was complete. A condenser was attached to the flask, which was swept with a dry nitrogen purge and refluxed for 2 hours after the initial 2½ hour reaction. The next day the solution was decanted from the mica, which was washed repeatedly with cyclohexane in 500 ml quantities and washed 3 times with 500 ml quantities of toluene. ESCA analysis showed no change in the polymeric coating on further washing with toluene or cyclohexane or extraction in a Soxhlet extractor.

Example 21A

A similar treatment was carried out with mica M-1 which had not been treated with thionyl chloride but had merely been dried at 300° C. to provide a dry surface containing SiOSi linkages.

Example 22

| Preparation of Reinforcement from Pretreated Substrate | | |
|---|---|---|
| Mineral Substrate | M-1 | Pretreated as described |
| Organic Compound | O-14 | Lithium-terminated S-B |
| Solvent | S-2 | Cyclohexane |

In this example, the polymer used for the treatment was 130,000 MW styrene-butadiene diblock living polymer (O-14). 150 Grams of mica, treated with thionyl chloride as before, was transferred to a round bottom flask and moistened with cyclohexane. 196 Grams of the copolymer (15% solids in cyclohexane) was added through the serum cap. The reaction was conducted similarly to that described in Example 21.

Example 22A

A similar treatment was carried out with mica M-1 which had not been treated with thionyl chloride but had merely been dried in nitrogen at 300° C.

Application of Coating Layer To Minerals Having Covalently Attached Polymer Reactive Surface Layer The mineral substrates modified according to this invention can be coated with a further polymer layer and this new product used to advantage as polymer reinforcement. The resulting products and their preparation and use are the subject of separate, copending patent applications. This separate use of the composition of this invention is illustrated in the following examples 23-27.

Example 23

| Solid | Product of Example 1 | |
|---|---|---|
| Organic Compound | O-1 | S-B-S |
| Solvent | S-1 | Toluene |

In a 2 liter beaker, 40 g of block copolymer O-1 was dissolved in 1200 ml toluene with heating and stirring. 401.8 g of the solid product prepared according to Example 1 was stirred into the solution for 5 minutes. The mixture was placed in a vacuum oven and evacuated very slowly to dryness with periodic mixing.

Example 24

| Solid | Product of Example 1 | |
|---|---|---|
| Organic Compound | O-2 | S-EB-S |
| Solvent | S-1 | Toluene |

50 g of block copolymer O-2 was dissolved in 1000 cc toluene in a 2 liter beaker with stirring and warming. When the polymer had completely dissolved, 500 g of the solid product prepared according to Example 1 was added to the beaker and the mixture stirred. The beaker was placed in a vacuum oven overnight at 50° C. and 30″ mercury. In the morning, the dried mica strongly adhered to itself, forming a mass which was difficult to remove from the beaker. The mass was broken up by chopping in a Waring blender and then pressed through a No. 10 screen with a rubber stopper.

Examples 25-27

| Example | 25 | 26 | 27 |
|---|---|---|---|
| Solid | Product of Example 5 | | |
| Organic Compound | O-1 | O-4 | O-3 |

In a 2 liter battery jar, 250 g of solid product prepared according to Example 5 was charged with 500 cc toluene and 25 g of block copolymer O-1. The mixture was stirred over a hot plate until the polymer dissolved and the suspension was well mixed. The suspension was placed in a vacuum oven and dried overnight at 50° C. The same procedure was used to coat 250 g of the solid with 25 g of polymers O-3 and O-4.

Illustrative Results of Surface Layer Thickness Determination by ESCA

Surface layer thickness determinations were carried out on samples prepared according to each of Modes 1, 2 and 3. The samples used in these determinations were prepared substantially as in the identified illustrative examples. Results are shown in Tables 2, 3 and 4.

Unless otherwise indicated in the tables, each sample was subjected to solvent treatment prior to ESCA analysis.

The purpose of the solvent treatment was to remove all of the organic material which was not chemically bound to the solid. The treatment consisted of exhaustive extraction in a Soxhlet extractor with a solvent in which the polymer grafting material is soluble. As shown in the examples of preparation, freshly prepared solids were given multiple washes, typically with hydrocarbon solvents. The solvent treatment was an additional treatment, carried out on the washed solids. The data from a number of solvent treatments with materials prepared via modes 1, 2 and 3, as described above, show that the polymeric grafts cannot be removed by such an extraction procedure, demonstrating that they are chemically bound to the surface. Use of azeotropes of polar mineral-wetting solvents plus polymer solvents similarly failed to remove the grafted polymers, as did treatment with mild acid or base. Strong acid or base treatment, however, corrodes the mineral surface and allows extraction of the grafted polymer species. Controls containing polymer but not catalyst have been shown, by contrast, to give coatings which are readily removed by solvent extraction.

Table 2 presents results of surface layer thickness determination by ESCA on solids prepared as in the noted examples according to Mode 1 and subjected to solvent treatment prior to analysis.

The data in the following tables demonstrate that the organic reactants are bound to the mineral surface in a layer of estimated thickness in the range of 5–500 Angstroms. The data on the solids prepared according to Examples 9, 18 and 20, before and after solvent treatment, show that substantially all the organic layer on the surface is so tightly bound that it is not removed by the treating solvent.

Example 6 shows that another composition prepared according to Mode 1 of this invention forms an adhering polymer layer which cannot be extracted by solvent treatment. In Example 6A, the preparation was identical to Example 6, except for omission of the catalyst. In this case a much thinner organic coating remained after solvent treatment. The elemental analysis of this remaining surface coating showed it to be rich in oxygen and poor in carbon. These two facts show that in Example 6A no graft representative of the polymeric grafting material was obtained. The layer observed in Example 6A may represent a small polar molecule, ion-exchanged on the surface of the glass, or it may represent the adventitious deposition of organic carbon in the spectrometer.

TABLE 2

ESCA Analysis of Surface Layers[a]

| Solid Prepared According to Example No.: | Relative Number of Surface Atoms | | | Calculated Surface Layer Thickness, Angstroms | |
|---|---|---|---|---|---|
| | Si | O | C | Before Solvent Treatment | After Solvent Treatment |
| Clean, dry Mica M-3 | 39 | 186 | 57 | | 8 ± 2 |
| 1 | 34 | 167 | 108 | | 15 |
| 1 | 21 | 94 | 308 | | 22 |
| 3 | 31 | 150 | 199 | | 17 |
| 5 | 50 | 238 | 94 | | 151 |
| 6[b] | 11 | 54 | 118 | 60 ± 15 | |
| 6 | 13 | 56 | 143 | | 72 ± 18 |
| 6A | 24 | 91 | 89 | | 9.6 ± 2.4 |
| 9[b] | 52 | 244 | 73 | 12 | |
| 9 | 53 | 248 | 77 | | 12 |

[a]Average over whole surface, where mean free path of 1000 EV electron is taken equal to 40 Angstroms.
[b]Washed on filter with toluene, but no Soxhlet extraction.

Table 3 presents results of surface layer thickness determination by ESCA on solids prepared as in the noted Examples according to Mode 2 and subjected prior to analysis to solvent treatment with the solvents shown in the Table.

TABLE 3

ESCA Analysis of Surface Layer

| Solid Prepared According to Example No. | Treating Solvent | Relative Number of Surface Atoms | | | Calculated Surface Layer Thickness, Angstroms | |
|---|---|---|---|---|---|---|
| | | Si | O | C | Before Solvent Treatment | After Solvent Treatment |
| 13 | Isopropyl alcohol and dichloroethane in sequence | 30 | 146 | 142 | | 20 |
| 18 | None | 13 | 65 | 278 | 36 | |
| 18 | Bromobenzene and benzene in sequence | 15 | 65 | 274 | | 32 |
| 19 | None | 33 | 135 | 118 | 24–30 | |
| 20 | None | 45 | 202 | 140 | 16 | |
| 20 | Toluene | 43 | 198 | 124 | | 15 |

Table 4 presents the results of surface layer thickness determinations by ESCA on solids prepared as in the noted Examples according to Mode 3 and subject prior to analysis to solvent treatment.

TABLE 4

ESCA Analysis of Surface Layers

| Solid Prepared According to Example No.: | Relative Number of Surface Atoms | | | Calculated Surface Layer Thickness, Angstroms | |
|---|---|---|---|---|---|
| | Si | O | C | Before Solvent Treatment | After Solvent Treatment |
| 21 | 34 | 163 | 105 | | 14 |
| 21A | 49 | 221 | 74 | | 10 |
| 22 | 26 | 108 | 189 | | 20 |
| 22A | 41 | 211 | 114 | | 12 |

Demonstration of Firmness of Bonding

The following data demonstrates the firmness of adhesion of an organic layer deposited on a mineral substrate according to this invention.

The solid component was prepared substantially as described in Example 1, using mica M-3, S-B-S copolymer O-1 and triflic acid catalyst C-1.

Separate samples of the solid were treated with aqueous liquid at progressively lower pH values, and then treated with toluene prior to the ESCA surface analysis. The data, presented in Table 5, show that treatments at pH 9-10 and treatment with aqueous HCl at pH 2 or with gaseous anhydrous HCl did not affect the thickness of the surface layer. However, treatment with concentrated HCl heated to boiling resulted in apparent removal of the surface layer as well as leaching of magnesium from the surface.

TABLE 5

| Treatment Prior to Toluene Extraction | Relative Number of Surface Atoms | | | Layer Thickness, Angstroms |
|---|---|---|---|---|
| | Si | O | C | |
| At pH 9-10 | 29 | 133 | 132 | 24 |
| HCl at pH2 | 31 | 135 | 136 | 24 |
| Gaseous HCl | 32 | 134 | 165 | 24 |
| Hot concentrated aqueous HCl | 98 | 285 | 108 | Too thin to estimate |

Effectiveness of Mineral Composition of the Invention in Reinforcing Polymer Matrix Mineral reinforcements prepared according to this invention were employed in reinforcement of polymers and the resulting solids tested for impact and stiffness properties.

500 gram batches of filled composition of polystyrene and treated mica were prepared as follows.

The components—treated mica flake and polymer beads—were mixed by shaking and tumbling for a few minutes in a two-quart glass jar. Melt mixing was carried out using a single screw extruder operated under the following conditions:

Brabender Extruder

Dimension of Screw: 25"×1"
Temperature: 210° C.
Screw RPM: 90

Extrudate was solidified on a Teflon coated aluminum sheet and subsequently chopped into beads. Extrusion was repeated a second time and extrudate again was chopped into beads.

The 500 gram batch of beads then was injection molded into test bars, using the following machine settings:

Battenfeld Injection Molding

Temperature: 465° F.
Injection Pressure: 950 psi
Clamping Pressure: 1800 psi
Back Pressure (feed): 250 psi
Mold Temperature: 100° F.

Each molding cycle produced one tensile test bar, two Izod impact test bars, and a circular disk. The tensile test bar was used to measure flexural modulus; the same bar was used for the tensile test. The two Izod test bars were used to measure notched Izod impact strength for two mold positions, viz., near the "gate" and near the "dead" end. Tests were performed in the temperature range 22±2° C. A description of test methods is given in the following section.

Test Methods

Three mechanical property tests were performed: (i) notched bar Izod impact test, (ii) three point bend test, and (iii) uniaxial tensile test.

The notched Izod test was carried out according to ASTM specification D-256-A-73 at an ambient temperature of 22±2° C. using $\frac{1}{8}$ inch thick test bars.

Flexural modulus was determined using a three point bend testing fixture with a 2.00 inch span between load reaction points. A load of a magnitude such that the maximum tensile bend stress would remain below 1500 psi was slowly applied and maintained for one minute, which permitted some inelastic strain relaxation to take place and for the deflection to reach a steady, reproducible value. The flexural modulus was calculated using the elementary bending formula for a simple beam subject to three point bending.

Tensile tests were performed using a model TTC Instron testing machine and a microformer extensionmeter (Baldwin) attached to the gage section of the standard injection molded tensile test bar. The total length of the straight portion of the gage section was 2.75 inches. The nominal cross sectional dimensions were $\frac{1}{8}$ inch × $\frac{1}{2}$ inch. Thin strips of adhesive tape were introduced between the surface of the specimen and the knife edges of the extensiometer to prevent failure from indentation stresses. Extensiometer sensitivity was a chart motion of 2 inches for a strain of 1%. The crosshead motion was set at 0.005 inches/minute corresponding to a strain rate of 0.0018 minute$^{-1}$ at the gage section. Yield stress and % elongation to fracture were obtained from the tensile test.

FIG. 1 is a plot of notched Izod impact vs. flexural modulus (an indicator of stiffness) for a number of filled compositions.

In each case, the polymer matrix has a commercial high impact polystyrene which had a notched Izod impact value of 1.5 ft-lb/inch notch and a flexural modulus of ca. $3.1 \times 10^5$ psi. In each case, the mica used was M-1 and the glass fiber M-4.

Line A of FIG. 1 shows the effect of addition of untreated mica (mica M-1) or untreated glass fibers (M-4). Increasing amounts caused a continuous decrease in impact resistance as stiffness increased. The concave shape of the curve shows that the smaller amounts of untreated mica or glass are especially effective in causing reduction in impact.

Line B represents the effect of using a mica of the type prepared in Example 1. Increasing amounts still caused a decrease in impact resistance with increasing stiffness, but at a lower rate than the untreated mica.

The line is straight and lies above the line for untreated mica, except at its lowest point.

Line C represents the results of using a mica of the type prepared in Examples 2, 5 and 7, and of glass fibers of the type prepared in Example 8. Such treated reinforcement, used at low concentrations, permit production of significantly stiffened polymer without loss of impact strength and even with a slight gain.

In the preparation according to Examples 1, 7 and 8, S-B-S block copolymer was a commercial polymer of somewhat higher molecular weight than S-B-S compound O-1. It was a nominally about 16,000-69,000-16,000 polymer.

Line D shows a significant increase in impact strength when using a reinforcement of the type prepared in Example 3 (but using mica substrate M-1, as in the other mica reinforcement of FIG. 1) in a concentration of 1.5%; some increase in impact is observed at a loading of 3.4%. The flexural modulus of the composite can be increased to 500,000 psi before the impact strength decreases below that of the unfilled polymers.

Table 6 shows mechanical properties of injection molded polypropylene homopolymer with and without the grafted reinforcements of this invention. The homopolymer itself at room temperature has a notched Izod impact of 0.42 ft/lbs and a flex modulus of 190,000 psi. Adding untreated mica raises the flex modulus to about 510,000 lbs and lowers the Izod impact strength to 0.34 ft/lbs. In contrast, if mica with S-B-S copolymer O-1 grafted to the surface, as prepared in Example 1, is blended with the polypropylene at the same volume percent level, the modulus is 460,000 lbs. per square inch, almost as good as the untreated mica, but the impact strength 0.52 ft/lbs, represents an increase over the homopolymer as well as a significant increase over the results with the untreated mica. If this grafted filler has a layer of S-EB-S copolymer O-2, which is more compatible with polypropylene than SBS, added to the surface, as shown in Example 24, the modulus remains nearly unchanged at 450,000 lbs per square inch and the impact strength is further increased to 0.64 ft/lbs per inch notch. Since the mica was present in each sample at 5% volume level, but in the case of the coated and grafted mica some weight of the reinforcement was made up by the graft and coat organic materials, the amount of mineral actually used was slightly less in the treated than in the untreated mica. This accounts for most of the decrease in stiffness relative to untreated mica.

TABLE 6

MECHANICAL PROPERTIES OF PP/MICA COMPOSITES

| Reinforcement Type* | Flex Modulus $10^5$ psi | Tensile** Modulus $10^5$ psi | Tensile Strength psi | Notched Izod Impact ft-lb/in. 75° F. | Notched Izod Impact ft-lb/in. −40° F. |
|---|---|---|---|---|---|
| None | 1.9 | 2.1 | 3740 | 0.42 | 0.31 |
| Untreated Mica | 5.1 | 4.2 | 3850 | 0.34 | 0.28 |
| Example 1 | 4.6 | 4.2 | 3890 | 0.52 | 0.34 |
| Example 24 | 4.5 | 3.8 | 3850 | 0.64 | 0.28 |

*Mica present at 5% volume levels.
**Tensile properties determined at 0.05 in./min; flex modulus determined at low stress levels under static load.

What is claimed is:

1. A polymer reinforcing material consisting of a particulate or filamentary mineral component having a thin polymer-interactive layer, averaging about 5–500 Angstrom in thickness, of silicon-free and heavy metal-free thermoplastic polymers chemically bonded to its surface by covalent bonding.

2. A polymer reinforcing material consisting of a particulate or filamentary mineral component having a thin polymer-interactive layer, averaging about 5–500 Angstrom in thickness, of silicon-free and heavy metal-free thermoplastic polymers chemically bonded to the surface by covalent M—O—C— or M—C— bonds, wherein M represents silicon, aluminum or other metals of groups 2 to 8 of the Periodic Table; M and O are components of the surface layer of said mineral material; and C is a component of said thermoplastic polymers, connected to at least one polymer-interactive group.

3. A polymer reinforcing material consisting of a particulate or filamentary layer, averaging about 5–500 Angstrom in thickness, of silicon-free and heavy metal-free thermoplastic polymers containing at least one olefinic double bond per molecule chemically bonded to its surface by covalent bonding resulting from reaction between surface oxygen or hydroxyl groups of the mineral component and double bonds of said thermoplastic polymers.

4. A polymer reinforcing material consisting of a particulate or filamentary siliceous mineral component having a thin, polymer-interactive layer, averaging about 5–500 Angstrom in thickness, of silicon-free and heavy metal-free thermoplastic polymers chemically bonded to its surface by co-valent —Si—O—C— or —Si—C— bonds wherein Si and O are components of the surface layer of said mineral material and C is a component of said thermoplastic polymers.

5. Composition according to claims 1, 2, 3 or 4 wherein said thermoplastic polymers are block copolymers having at least one block A and one block B wherein block A is polystyrene and block B is polybutadiene, polyisoprene or hydrogenated polybutadiene or polyisoprene.

6. Composition according to claims 1, 2, 3 or 4 wherein said mineral component is glass, mica, asbestos, talc, clay, silica gel, alumino-silicate or alumina.

* * * * *